July 23, 1968   J. T. MEIENBERG   3,393,426
LATERAL SPREADING EXTRUDER DIE ASSEMBLY
Filed July 11, 1966   2 Sheets-Sheet 1
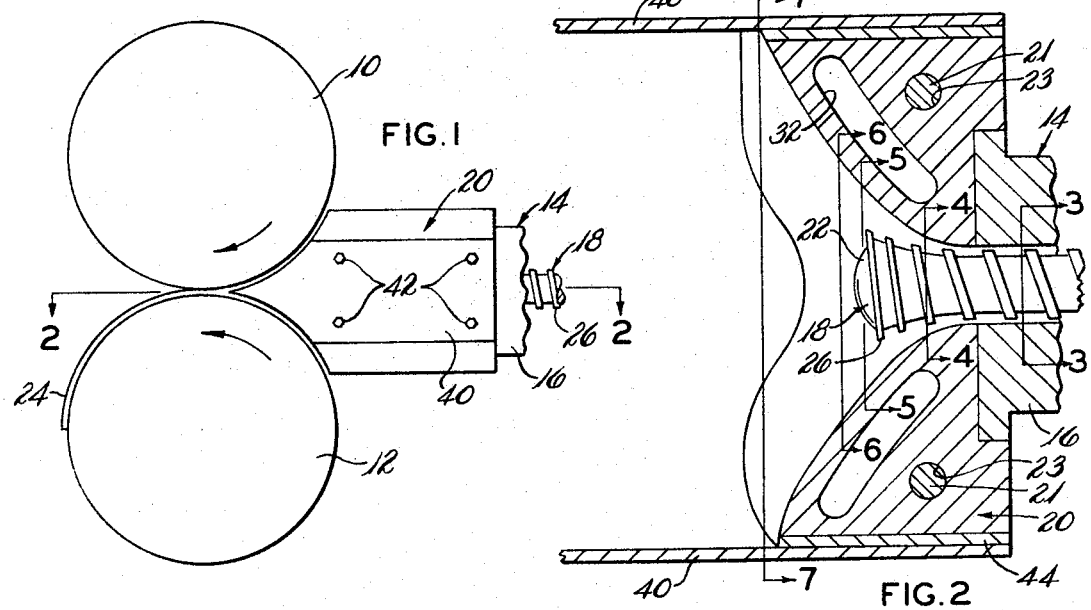
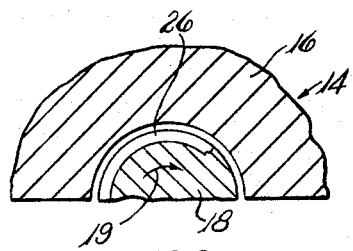
FIG.3
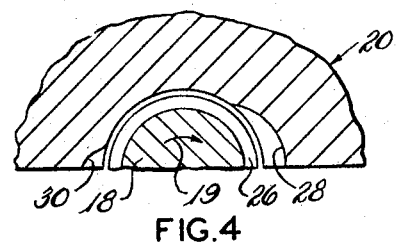
FIG.4
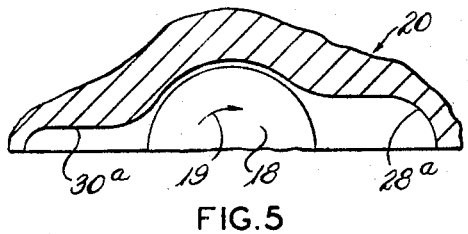
FIG.5
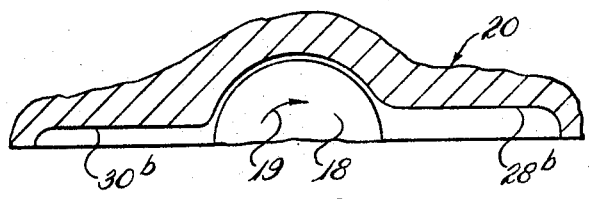
FIG.6
INVENTOR.
JOHN T. MEIENBERG
BY
Oldham & Oldham
ATTYS.

INVENTOR.
JOHN T. MEIENBERG
BY
Oldham & Oldham
ATTYS.

United States Patent Office 3,393,426
Patented July 23, 1968

1

3,393,426
LATERAL SPREADING EXTRUDER
DIE ASSEMBLY
John T. Meienberg, Brecksville, Ohio, assignor to Adamson United Company, Akron, Ohio, a corporation of Ohio
Filed July 11, 1966, Ser. No. 564,125
10 Claims. (Cl. 18—12)

ABSTRACT OF THE DISCLOSURE

An extruder assembly for delivering stock to calender rolls or the like including an extruder casing having a discharge end, and driven extrusion screw means received in the extruder casing for stock discharge. A wide, flat die means is secured to the discharge end of the casing and such die means has a passage therethrough with an internal substantially circular input opening progressively widening to a flat discharge opening. This passage has substantially laterally opposed sections each of which is enlarged in non-uniform relation to a horizontal center plane of the die means. The screw means extends into the passage in the die means.

---

Figure 7:
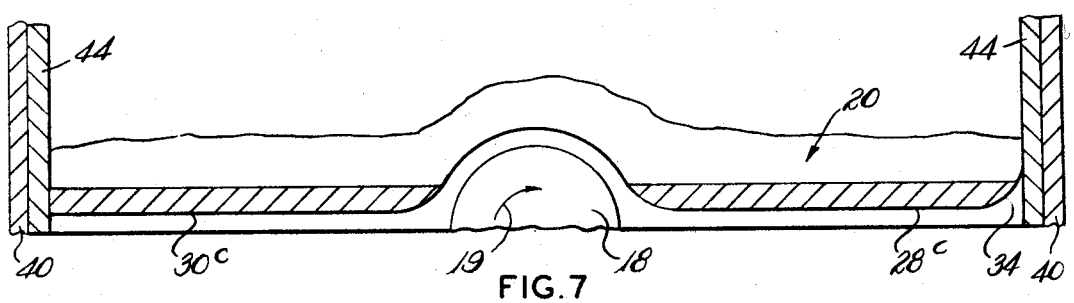

This invention relates to an extruder and die head assembly for delivering stock to the rolls of a calender, as is commonly done in an extruder and roller die calender combination. More particularly, this invention realtes to an extruder and die head combination wherein the die head is positioned on the delivery end of the extruder and is adapted to effect a uniform lateral spreading along with a forward delivery of the stock from the extruder.

Heretofore there have been various kinds and types of dies utilized in combination with an extruder for delivering stock to calender rolls, but these prior art dies have not been effective in producing a uniform lateral spreading of stock delivered from the extruder as well as a forward delivery. As a result, the prior art extruder and die combinations have not been efficient in laterally spreading stock over considerable distances whereby a uniform bank of stock can be maintained in a bite formed by two calender rolls. Prior art combinations usually overfeed the center of the bank of stock and starve the outside edges.

It is the general object of the present invention to overcome the difficulties in the prior art by providing an extruder and die assembly whereby the die effectively spreads out the extruded stock by restricting the delivery to the center of the bank, and improving delivery to the outside edges to obtain more uniform distribution.

It is a further object of the present invention to provide a die in combination with an extruder wherein the die progressively widens at selected areas where screw delivery of stock is best in order to effect a lateral spreading as well as a forward delivery of stock from the extruder.

It is a further object of the present invention to provide a die means having a reduced size opening forward of selected widened areas therein in order to increase the tendency of the stock delivered from the extruder to spread laterally into the widened areas.

In the drawings, FIG. 1 is a broken away side elevation of a preferred embodiment of the extruder and die assembly of the invention, particularly illustrating stock being delivered from the die to the bite formed by a pair of calender rolls;

FIG. 2 is a broken away cross sectional view taken substantially from line 2—2 of FIG. 1;

FIGS. 3, 4, 5, 6, and 7 are all broken away half vertical sections of the extruder and die assembly taken substantially from lines 3—3, 4—4, 5—5, 6—6, and 7—7, respectively of FIG. 2;

2

Figure 8:
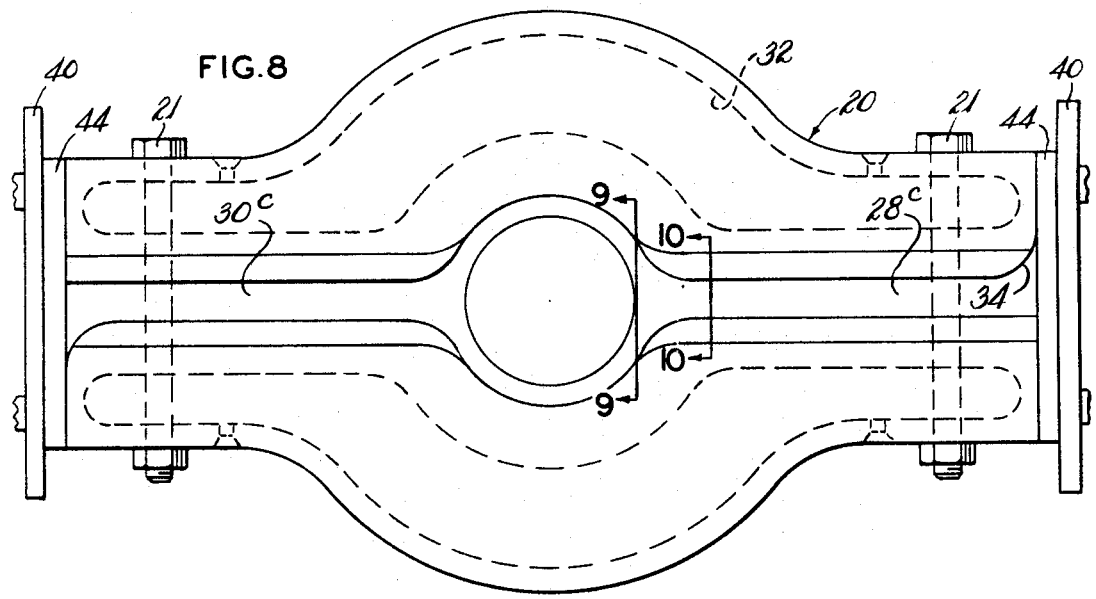

FIG. 8 is an end elevation of the die of the invention; and

Figure 9:
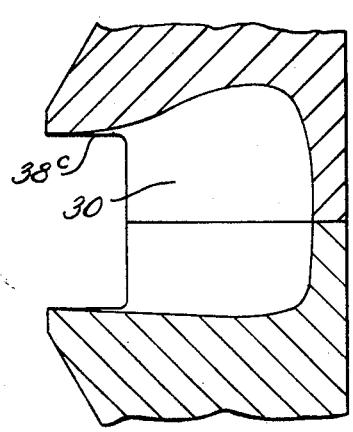
Figure 10:
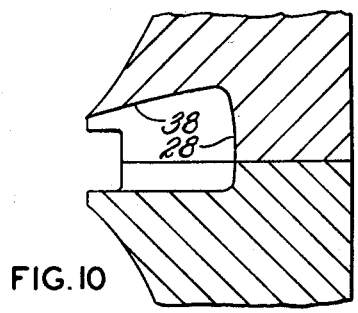

FIGS. 9 and 10 are fragmentary, vertical cross sectional views taken substantially from lines 9—9 and 10—10, respectively, of FIG. 8.

In the drawings, and referring first to FIG. 1, the numerals 10 and 12 indicate two calender rolls, respectively, such as the top roll and the bottom roll of a two roll vertical calender. In order to feed a bank of stock into the bite formed by calender rolls 10 and 12, an extruder and die assembly generally indicated by the numeral 14 is provided. The extruder includes, as best illustrated by FIG. 2, a barrel 16 and a screw 18 which is received therein. Clamped to the delivery end of the barrel 16 are two complementary die halves 20 which are secured to each other by suitable bolt means 21 received by holes 23 in the die halves.

The die 20 formed by the die halves is properly contoured to have a substantially circular inlet opening at one end to smoothly mate with the opening in the barrel 16 and to receive the end 22 of screw 18. The end 22 of the screw is of a design to restrict the forward movement of the stock and to increase the tendency for "side delivery," or lateral distribution, by having a continuously decreasing area in the thread groove profile as the thread advances toward the discharge end of the screw. The internal opening of the die 20 is contoured from the inlet opening to a wide flat discharge opening that extends substantially the entire width of calender rolls 10 and 12. The purpose of the die 20 is to effect a lateral spreading as well as a forward delivery of stock passing through the extruder 14 so that a uniform bank of stock can be delivered to the bite formed between calender rolls 10 and 12.

The lateral spreading of the stock as it passes into the die 20, as will be explained in greater detail hereinafter, is accomplished by progressively widening the passage in the die 20 at certain selected areas where the best delivery of the stock by screw 18 takes place. By widening these selected areas, the pressure confining the stock is relieved and the stock tends to spread into the widened area, aided by the direction of rotation of screw 18.

FIG. 3 illustrates the relationship of screw 18 and barrel 16 in the extruder 14. As is well known, the screw 18 has a plurality of helical threads 26 formed thereon whereby rotation of screw 18 in barrel 16 tends to mix stock which is fed therein and also deliver it in a forward fashion through the extruder.

FIG. 4 illustrates the die 20 beginning to widen at selected laterally opposed areas 28 and 30. Since the stock being fed through the extruder and die assembly is being worked at very great pressure and being sheared continually by the rotating action of screw 18, widening the passage in the die 20 at selected areas 28 and 30 tends to relieve the pressure exerted on the stock, allowing it to flow into widened areas 28 and 30 and begin to effect a lateral spreading as well as a forward delivery of the stock. It is an important aspect of the invention that the widening in area 28 is considerably larger than the widening in area 30 since it is desired to utilize the clockwise rotation of screw 18, moving the stock away from center in the upper right hand quadrant, to force the material laterally along the top roll of the calender on the right side. Naturally in the bottom half of the die, the widened area 28 would be on the opposite side, to cooperate with the bottom roll and force the stock to the left, again taking advantage of the clockwise rotation of screw 18, which moves the stock away from center in the lower left hand quadrant. The reduced widening of area 30 in the top and bottom halves of the die tend to prevent overfeeding the center of the bank between the calender rolls. This enlargement to take advantage of the direction of screw rotation and the pressure differentials set up thereby, is quite similar to the casing construction utilized in the discharge port of a conventional centrifugal pump.

The progressive widening of the die 20 continues and as illustrated by FIGS. 5 and 6, substantially increased areas 28a and 30a, and 28b and 30b, are provided in the die 20 in order to increase the lateral spreading of the stock being fed into the die 20 by extruder 14. The area 28b of FIG. 6 is wider but lower in height than the preceding area 28a of FIG. 5, so that the forward motion of the stock is somewhat restricted, and its lateral motion is encouraged. FIG. 7 illustrates areas 28c and 30c formed in the die 20 at the point when the die is about to deliver the stock to the bite formed between calendar rolls 10 and 12. At this point it should be carefully noted that the right hand and left hand areas are more nearly equal in size, but that the difference in the right and left hand areas previously shown in FIGS. 5 and 6 have delivered a larger volume of stock to the right in this top half of the die. The bottom half of the die, of course has the larger volume at the left side.

FIG. 7 also illustrates that the die 20 has an enlarged upwardly tapered end area 34 which is flared upwardly from the area 28c. This area 34 forms an important contribution to the die design as it relieves the pressure on the stock allowing it to move laterally to the outside edge of the opening, providing a larger volume of stock to this part of the bank, where it is most required. In the lower half of the die, the flared end area is of course at the left, and the flare is downward.

As illustrated by FIG. 8, die 20 has axially extending cooling chambers 32 formed therein which have water (not shown) circulated therein in order to cool the stock as it is being fed through the extruder and die assembly of the invention. FIGS. 9 and 10 illustrate further the reduction of areas 28 and 28a in the forward direction of stock motion, and the smaller forwardly restriction of the reduced areas 30 and 30a, by showing the upper and lower halves of the die as assembled. The numbers 38 and 38c show the restriction in the discharge opening of the die.

It is an added feature of the invention that the widened areas 28 and 28a are on one side of screw 18 and are enlarged at a point substantially vertically higher than circumferentially opposed areas 30 and 30a. As a result, with the direction of rotation of screw 18 being in the direction of the indicating arrow 19, the stock which laterally spreads into widened areas 28 and 28a on the right side tends to feed more heavily up to roll 10, while the stock being laterally spread into the smaller widened areas 30 and 30a on the left side tend to feed less stock up to roll 10. The lower half of the die distributes the stock similarly against roll 12, but to the opposite hands, feeding more stock to the left and less to the right, again cooperating with the direction of screw rotation. The stock, which is fed asymmetrically against rolls 10 and 12, is carried into the bank by the rotation of said rolls in the direcitons shown by the arrows in FIG. 1.

A pair of stock guides or baffles 40 are secured by suitable bolt means 42 to the respective sides of the die 20 and a pair of spacers 44 contoured to the same opening as the die are held in place thereby in order to control the width of the bank fed by the die 20 into the calender. The baffles 40 are easily removed in order to permit different spacers to be put in position on the die 20, and it also should be understood that by simply removing bolts 21 the halves of the die 20 can be unclamped from the barrel 16 of the extruder so that a different size die can be repositioned thereon.

The rolls 10 and 12 are of conventional construction and can be positioned and/or driven by conventional means. Likewise the extruder 14 is suitably secured in position at the roll bite. The screw 18 may have any desired type of threads 26 provided thereon and the screw extends any suitable distance from the extruder 14 and is journalled and driven by conventional means. The stock being processed can be prepared for extrusion by preworking it in known manners and it is fed to the screw and die assembly in a conventional manner.

While a certain representative embodiment and details have been shown for the purposes of illustrating the invention, it will be apparent to those skilled in this art that various changes and modifications may be made therein without departing from the spirit or scope of the invention.

What is claimed is:

1. In an extruder for delivering stock to calender rolls or the like, the combination of
an extruder casing having a discharge end,
driven extrusion screw means rotatably received in said casing so that rotation of said screw means effects extrusion of stock from the discharge end of said casing, and
wide flat die means positioned on the discharge end of said casing, said die means having a passage therethrough with an internal substantially circular input opening progressively widening to a wide flat discharge opening, said passage having substantially laterally opposed sections each of which is enlarged in non-uniform relation to a horizontal center plane of said die means, the greater lateral opening occurring in those areas where the delivery of stock by said screw means is under the greater lateral pressure to effect a lateral spreading rather than a forward delivery of stock whereby a substantially uniform amount of stock can be delivered from the opening across the width of said opening, said screw means extending into said die means passage.

2. The combination according to claim 1 whereby the passage in said die means is restricted in size immediately behind the discharge opening, and where the greater size passage portions are formed, in relation to adjacent smaller size passage portions, upstream of such smaller size passage openings in relation to the direction of rotation of said screw means.

3. The combination according to claim 1 wherein the passage through said die means non-symmetrically progressively widens at two circumferentially opposed portions substantially aligned with the discharge opening of said passage with one widened portion being more enlarged in one part thereof and the other portion being more enlarged in the opposite part thereof, wherein the more enlarged parts correspond to the screw delivery areas of greatest lateral pressure.

4. The combination according to claim 3 wherein the opening when viewed in plan is in the form of a gradual curve protruding forwardly more toward the center of each side and then curving toward the ends to thereby facilitate lateral flow of stock in both directions parallel to the external opening.

5. The combination according to claim 1 wherein said screw means is enlarged at the discharge end thereof extending into said die means, said die means being shaped to receive the increased diameter of the screw.

6. In an extruder for delivering stock to calender rolls or the like, the combination of
an extruder casing having an input portion and a discharge end, driven extrusion screw means rotatably received in said casing to effect extrusion of stock from the discharge end of the casing, and
wide flat die means secured to the discharge end of said casing, said die means having top and bottom sections combining to form a passage therethrough with an internal substantially circular upstream opening progressively widening to a wide flat discharge opening when viewed in section, said sections having walls defining said passage each section having substantially laterally opposed circumferentially spaced portions that progressively widen in non-uniform relation to each other, and said screw means extending into said die means passage.

7. In an extruder as in claim 6 where said die means sections have walls that widen and enlarge said passage, said sections are of equal size, each said section having a relatively large passage opening therein and a relatively small passage opening therein, and the relatively large passage opening in one die means section connecting to the relatively small passage opening in the other die section.

8. In an extruder as in claim 7, where said wide flat discharge opening is vertically enlarged at each lateral margin thereof by a portion of each die means section connecting to the relatively large passage opening formed therein.

9. In an extruder as in claim 6, said screw means having a thread thereon which has a thread groove profile that gradually decreases in area adjacent the end of said screw means to aid in lateral distribution of the stock.

10. In an extruder as in claim 6, where said die means passage has greater enlargement in an area where the peripheral motion of said screw means is towards such area and has less enlargement in an area where the peripheral motion of said screw means is away from such area.

References Cited
UNITED STATES PATENTS

| | | | |
|---|---|---|---|
| 2,897,541 | 8/1959 | Orsini | 18—12 |
| 2,975,475 | 3/1961 | Heston | 18—15 XR |
| 3,085,289 | 4/1963 | Van Riper | 18—15 XR |
| 3,274,645 | 9/1966 | Chase | 18—12 |
| 3,302,239 | 2/1967 | Senecal | 18—12 |
| 3,197,815 | 8/1965 | Van Riper | 18—12 |

FOREIGN PATENTS 994,882  8/1951  France.

OTHER REFERENCES

German printed application 25,134, September 1956.

WILLIAM J. STEPHENSON, *Primary Examiner.*